United States Patent Office 3,112,346
Patented Nov. 26, 1963

3,112,346
2,3,6-TRICHLORO-β-NITROSTYRENE
Edward David Weil, Lewiston, and Jerome Linder, Niagara Falls, N.Y., assignors to Hooker Chemical Corporation, Niagara Falls, N.Y., a corporation of New York
No Drawing. Filed May 25, 1961, Ser. No. 112,546
1 Claim. (Cl. 260—645)

This invention describes a new and useful aromatically derived herbicide and intermediate.

More specifically, this invention comprises a novel composition of matter, 2,3,6-trichloro-β-nitrostyrene, useful as a herbicide and an intermediate for making herbicidally active compounds.

In its herbicidal aspect, the composition of this invention has several important advantages over many of the commercially available herbicides. For example, the composition is unexpectedly active as a selective pre-emergence herbicide, particularly against broadleaf weeds and many species of perennial weeds resistant to commercial herbicides such as 2,4–D. Examples of recalcitrant weed species that succumb to the 2,3,6-trichloro-β-nitrostyrene include but are not limited to bindweed, trumpet vine, puncture vine, seedling Johnson grass, horsetail, sorrel and brush generally.

Another advantageous and most surprising activity that this composition possesses is phytotoxicity toward many grassy weeds found in sugar cane fields, without phytotoxicity toward the sugar cane. While some nitrostyrenes have been known to exhibit insecticidal activity, none have been known as herbicides particularly against grassy weed species in sugar cane.

Another ancillary but significant advantage of this composition is its high solubility in oils such as diesel oils and petroleum oils generally. Most commercially available herbicides such as 2,4–D and other chlorinated aromatic acids and their salts, the chlorates, borates, trichloroacetates, and herbicidal arylureas are insoluble in oil solvents. This oil solubility is a significant advantage since this composition when formulated in oil exhibits an enhanced and much faster phytotoxic effect (as compared to aqueous or dry formulations), against recalcitrant weed species which is manifested in several ways such as rapid foliar kill, long term repression of weed growth, and lower rates of application than would be necessary if the herbicide were to be formulated in a conventional water solution or emulsion. This latter advantage of lower rates of application is an important consideration especially where the land to be treated is large in area and of low economic value such as is found in the scrub brush land of the Southwest, or the land bordering railroad rights-of way.

An additional advantage of the novel method of this invention is that it lends itself to the use of various grades of purity, by itself or in combination with other biologically active compositions. For example, these herbicidal compositions offer the advantage of compatibility with a host of other herbicides including the tri- and tetrachlorophenylacetic acids and the sodium borates and calcium borates, 2,4–D and other herbicidal phenoxy aliphatic acids and esters, simazine and other herbicidal triazines, monuron, fenuron, diuron and other herbicidal ureas, herbicidal chlorates, herbicidal petroleum oils, hexachlorocyclopentadiene, pentachlorophenol, dinitro-o-alkylphenols, sodium trichloroacetate and sodium 2,2-dichloropropionate, and with various adjuvants and diluents well known to the art. Thus, these herbicides may be used by themselves or made the subject of liquid or solid formulations ranging from the very simple to the most elegant. For example, if it is desired these compositions may be made the subject of a liquid formulation by diluting, dispersing, dissolving or emulsifying with a surface active adjuvant or combination of these adjuvants in organic solvents such as petroleum hydrocarbons, alcohols, ketones, esters, glycols or combination thereof. Or alternatively, the novel herbicides may be made up as solid formulations of powders, dusts, wettable dusts, granules and pellets using solid diluents such as talcs, clays, flours, starches, diatomaceous earths, mica, alkaline earth limes, carbonates and phosphates either finely divided, granular or pelleted in form.

These solid and liquid formulations facilitate handling and application and sometimes enhance herbicidal activity to more than an additive degree.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. By the term surface active agents are included wetting agents, dispersing agents, emulsifying agents and the like. A satisfactory but not complete list of such agents is set forth in an article in "Soap and Chemical Specialties," vol. 31, No. 7, pages 50–61; No. 8, pages 48–61; No. 9, pages 52–67, and No. 10, pages 38 (67) 1955. Other sources of adjuvant materials is set forth in Bulletin E–607 of the Bureau of Entomology and Plant Quarantine of the United States Department of Agriculture.

While the manner and method of application of the inventive compositions is varied and largely dependent upon the climatic conditions, crop treated, the weeds to be eradicated, the equipment available and the convenience of the user, a preferred embodiment of this invention is to apply our new herbicide as a spray after making it up as a liquid formulation comprised of several times its weight of a petroleum hydrocarbon solvent such as petroleum naphtha, kerosene, diesel oil, xylene, "weed oil," fuel oil, etc., optionally with small quantities of an emulsifier such as a commercial polyoxyethylene ether and a surfactant such as alkylaryl sulfonate mixture. This type of mixture is either sprayed without further dilution or emulsified with water and sprayed on the weed population or on the soil where weed growth is to be prevented.

The rate of application of the inventive herbicidal composition cannot be precisely stated due to varying degrees of resistance possessed by the weed species and crop, the stage of weed and crop growth, the soil type and climatic conditions, but in general, the rates will be at least one-quarter of a pound of herbicide per acre and for reasons of cost will seldom exceed four hundred pounds per acre with the preferred falling within five-tenths to fifty pounds per acre. Where the weeds or brush are in an early stage of growth, they being more susceptible, will frequently respond to the rates from one-half to four pounds per acre while older weeds or brush that are to be totally eradicated may require rates in excess of ten pounds per acre. In those instances where well established brush in encountered or where the weed population has been allowed to accumulate unchecked or where mature plants are encountered, applications of up to fifty and even beyond this rate may be required. For eradication of deeply-rooted herbicide-resistant perennial weeds such as field bindweed or for long term sterilization rates of ten pounds up to several hundred pounds per acre may be necessary.

The compound of the invention may also be employed at sub-lethal rates to produce stunting of plants. For example, the growth of brush under power lines may be retarded in this way.

The composition of this invention is a crystalline material, melting point 68.5 to seventy degrees centigrade and is prepared by the reaction of nitromethane with 2,3,6-trichlorobenzaldehyde in the presence of a base. Suitable bases include, but are not limited to caustic soda, potash, sodium alkoxides, sodium hydride, lime, or strong basic tertiary amines such as tetramethylguanidine. The above process does not require any particular reaction conditions, giving acceptable yields at temperatures ranging from about zero degrees centigrade to about one hundred degrees centigrade, and is usually complete in less than two or three hours. The final product is isolated from the reaction mixture ordinarily by diluting with water, neutralizing with acid and extracting with a water immiscible solvent such as the aromatics. The solvent may be removed by evaporation and where purified material is desired, distillation and/or recrystallization is resorted to. Where the material is destined for herbicidal use, the solvent extract may be used directly and no further purification is required.

The examples which follow are intended only to illustrate the workings of this invention, but are not intended or to be construed as limiting this invention in any manner whatsoever except as provided by the specification and the claims.

*Example 1.—Preparation of 2,3,6-Trichloro-β-Nitrostyrene*

A solution consisting of sixty-two grams of nitromethane and two hundred and ten grams of 2,3,6-trichlorobenzaldehyde in two hundred cc. of methanol is cooled to ten to fifteen degrees centigrade. At this temperature, forty-two grams of caustic soda in one hundred and forty-two cc. of water is added slowly, keeping the temperature at fifteen degrees centigrade or less. After one hour, all the materials were completely soluble and the contents solidified out within thirty minutes. Three liters of water is added to the solution whereby the entire contents once become homogeneous. The resulting solution is acidified with a solution consisting of two hundred cc. of concentrated hydrochloric acid in three hundred cc. of water. The resulting material is extracted with benzene and the benzene is removed by distillation. The resulting product is distilled and a portion recrystallized melting point 68.5 to seventy degrees centigrade.

*Anal.*—Calcd. for $C_8H_4Cl_3NO_2$: Cl, 42.2 percent; N, 5.55 percent. Found: Cl, 42.0 percent; N, 5.4 percent.

*Example 2.—Herbicidal Oil Formulation of 2,3,6-Trichloro-β-Nitrostyrene*

The following were mixed:

Diesel oil _____ gallons__ 10
2,3,6-trichloro-β-nitrostyrene _____ pounds__ 1

The components were blended to make a homogeneous solution.

When sprayed at the rate of eighty gallons per acre on honeysuckle and trumpet vine, this formulation produced complete kill within one week and no regrowth occurred within six months. With the oil only, only transitory foliar burn occurred, followed by development of new healthy foliage within several weeks.

*Example 3.—Emulsifiable Formulation*

The following were mixed to a homogeneous blend:

2,3,6-trichloro-β-nitrostyrene _____ 2 pounds.
Emulsifier (sodium alkylnaphthalene - sulfonate - sorbitan laurate polyoxyethylene ether) _____ 0.4 pound.
High aromatic naphtha solvent _ To make total 1 gallon.

The formulation, emulsified in one hundred gallons of water, was sprayed pre-emergence on land infested with ragweed at two pounds of 2,3,6-trichloro-β-nitrostyrene per acre. Essentially one hundred percent control of ragweed was obtained for a four month period.

*Example 4.—Granular Formulation*

Granular clay of twenty-four to forty mesh size was tumbled and sprayed evenly with molten 2,3,6-trichloro-β-nitrostyrene until ten percent by weight of the latter had been impregnated on the clay.

This formulation when spread evenly at the rate of two hundred pounds of granules per acre on land infested with field bindweed gave better than ninety percent control of the bindweed within six months.

*Example 5.—Control of Perennial Weeds*

The compound of the invention was applied at twenty-five pounds per acre in early spring to a heavy infestation of field bindweed. Six months later, substantially complete kill of the bindweed was noted.

*Example 6.—Pre-Emergence Weed Control in Sugar Cane*

The compound of the invention was applied at four pounds per acre on disked land at the time of planting sugar cane. The area used had a natural infestation of Johnson grass seedlings. After two months, essentially complete control of Johnson grass seedlings was noted with no damage to sugar cane.

*Example 7.—Pre-Emergence Weed Control*

The compound of the invention was sprayed (in aqueous emulsion), pre-emergence to weed infested soil at the rate of eight pounds per acre. One month later, one hundred percent control was noted of the following weeds: quackgrass, foxtail, ryegrass, crabgrass, Johnson grass, dock, mustard and chickweed. Field corn planted in the treated area was not significantly damaged.

*Example 8.—Post-Emergence Weed Control*

The compound of the invention was sprayed at the rate of eight pounds per acre in aqueous emulsion on a mixed weed population. One month later, complete kill was noted with dock, mustard, pigweed, lamb's-quarters, chickweed, and crabgrass.

We claim:
2,3,6-trichloro-β-nitrostyrene.

References Cited in the file of this patent

UNITED STATES PATENTS

| | | |
|---|---|---|
| 2,824,822 | Goodhue et al. | Feb. 25, 1958 |
| 2,884,465 | Tinsley | Apr. 28, 1959 |
| 2,895,869 | Bluestone | July 21, 1959 |
| 2,993,936 | Saunders | July 25, 1961 |

OTHER REFERENCES

Schonhofer et al.: Arzneimittel-Forsch., vol. 8, pp. 374–6 (1948); CA. 53:2365 (b), 1959.